UNITED STATES PATENT OFFICE.

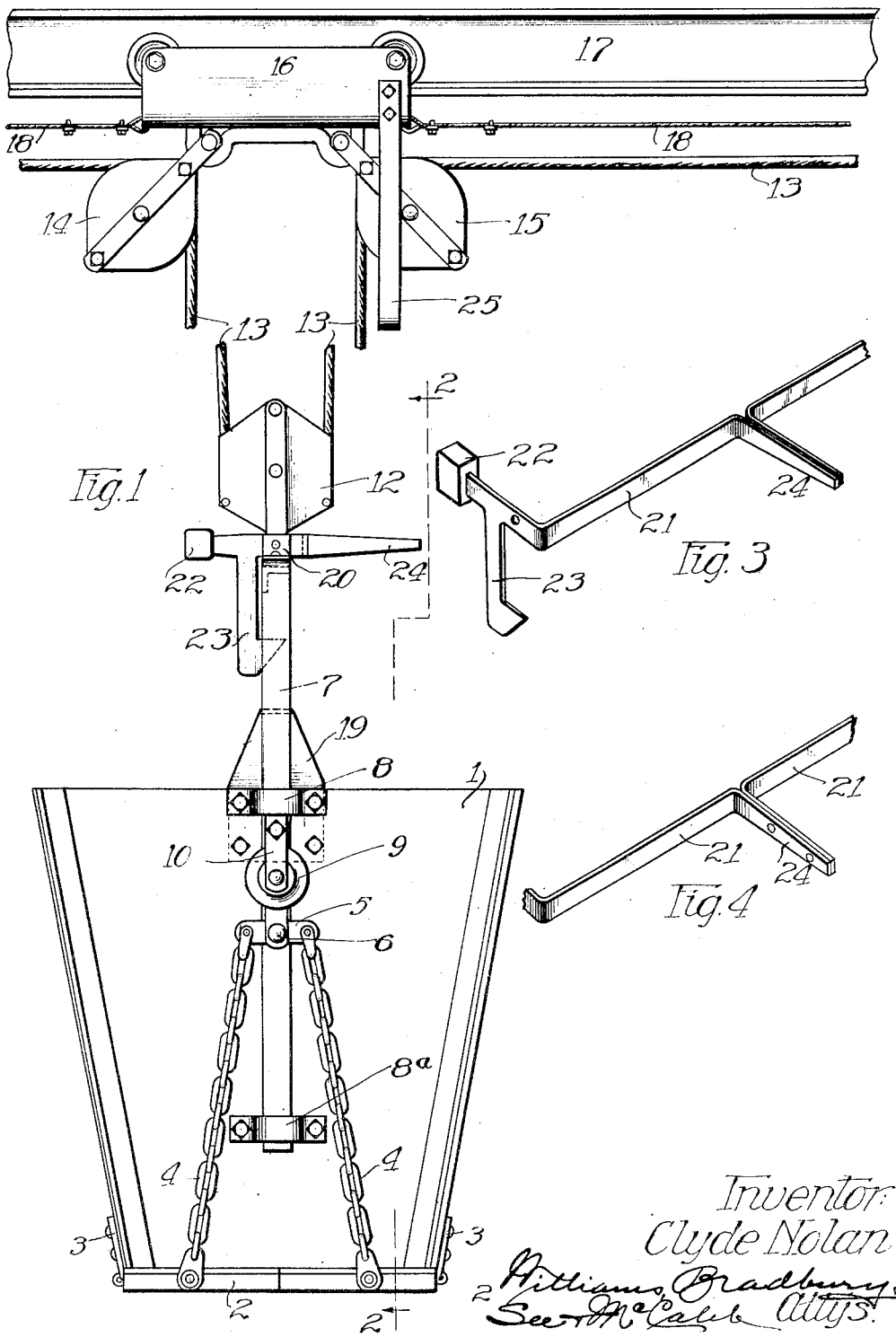

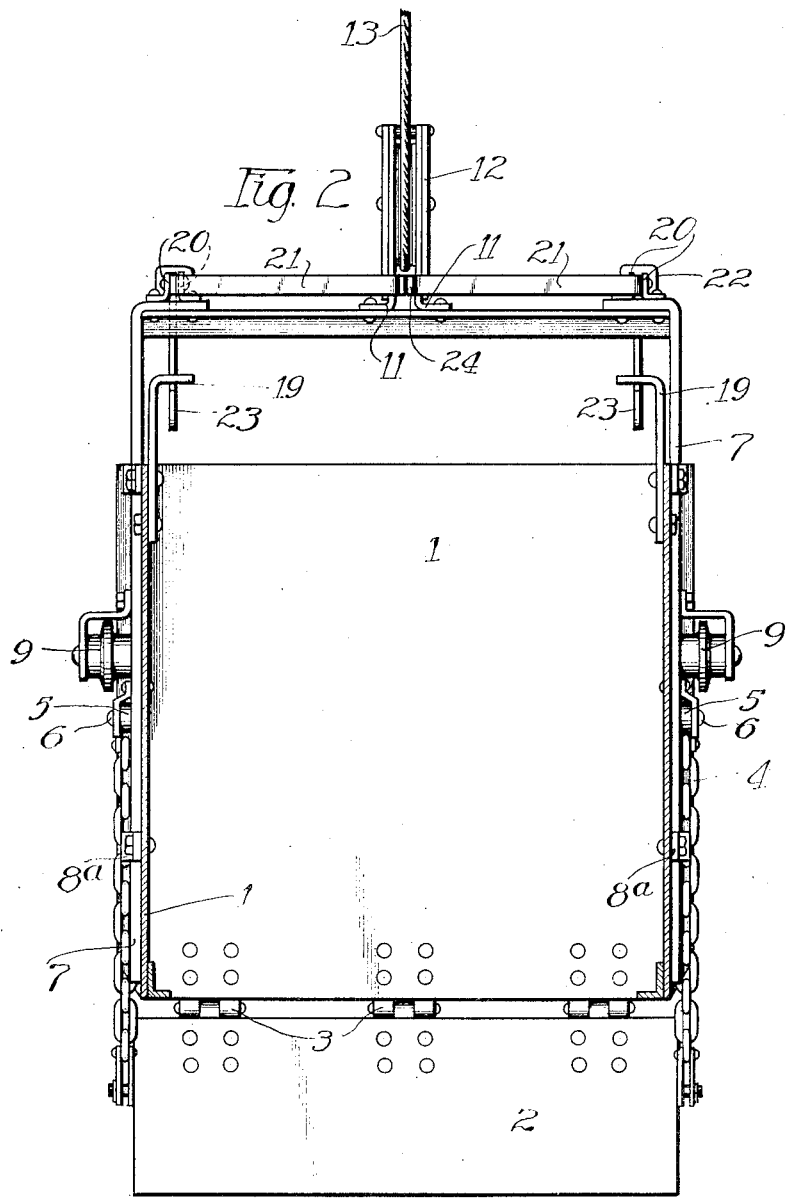

CLYDE NOLAN, OF CHICAGO, ILLINOIS, ASSIGNOR TO AMERICAN STEAM CONVEYOR CORPORATION, OF CHICAGO, ILLINOIS, A CORPORATION OF NEW YORK.

SELF-OPENING BUCKET.

1,411,454.          Specification of Letters Patent.          Patented Apr. 4, 1922.

Application filed June 11, 1920. Serial No. 388,353.

*To all whom it may concern:*

Be it known that I, CLYDE NOLAN, a citizen of the United States, and resident of Chicago, in the county of Cook and State of Illinois, have invented a certain new and useful Improvement in Self-Opening Buckets, of which the following is a full, clear, concise, and exact description, reference being had to the accompanying drawings, forming a part of this specification.

My invention relates to a bucket capable of being employed in trolley carrier systems, and the object of my invention is to provide a bucket of this class which, when lowered to the ground, bottom of a bin, or upon a pile where its contents are to be dumped, will so adjust itself that when the bucket is subsequently raised the doors thereof will fall upon and permit the material contained in the bucket to be discharged therefrom, the doors being arranged to assume their normal closed positions after the contents of the buckets have been discharged therefrom.

The combination and construction of parts whereby I attain the objects of my invention will be best understood by reading the description to follow in connection with the accompanying drawings in which—

Figure 1 is a side elevational view of the bucket of my invention, together with the trolley associated with the bucket and the cables whereby the trolley is operated and whereby the bucket is lowered from and raised toward the trolley, as required.

Figure 2 is a vertical sectional view taken on the line 2—2 of Figure 1, illustrating the several parts of the bucket in the positions assumed thereby when the bail is depressed and the doors are open.

Figure 3 is an isolated detailed perspective of the hook mechanism forming part of my invention; and Figure 4 is a view generally similar to Figure 3, illustrating a modification wherein the two hooks are positively and mechanically connected together.

Similar characters of reference refer to similar parts throughout the several views.

Referring first to Figure 1, it will be noted that the bucket of my invention is of tapering form and is open at top and bottom. The bucket which is indicated at 1 is provided with doors 2—2 which normally close the open lower end of the bucket, said doors being mounted upon the bucket by suitable hinges 3—3. Each door has each of the ends thereof connected by a chain or other flexible link 4 to an equalizing bar 5 pivoted at 6 to one of the vertical legs of a substantially U-shaped bail or bucket carrier, indicated at 7. It will be noted that each of the equalizing bars 5 is connected with both doors so that the lifting force applied to the bucket, as will be presently explained, is equally applied to the doors.

Each of the vertical legs of the bail or bucket carrier 7 is embraced by straps 8 and 8ª. These straps pass around the legs of the bail and have their ends bolted or riveted to the sides of the bucket. It will thus be seen that the bail 7 is capable of a certain amount of vertical movement independent of the bucket proper. At this point attention is directed to the rollers 9—9 which are carried by the vertical legs of the bail 7. The outer ends of these rollers are journaled in bracket bearings 10 carried by the bail. It is the purpose of these rollers to co-operate with a suitable track when the bucket is lowered into certain types of pits which may be used in connection with the trolley carrier system of which the bucket of my invention forms a part. The rollers 9—9, however, constitute no essential part of the present invention.

The top or horizontal portion of the U-shaped bail 7 is provided with a pair of brackets 11—11 to which is pivoted a sheave 12. This sheave is designed to co-operate with the lifting cable 13. It will be understood that the sheave 12 engages the cable 13 at a point intermediate the sheaves 14 and 15 carried by a suitable trolley 16. The trolley is mounted for movement upon a suitable track, as 17, and is moved and controlled by the cable or cables 18.

It will be understood that in the operation of the carrier system of which my bucket forms a part, the bucket, after being filled, is raised to a position beneath the trolley 16 by shortening that loop of the lifting cable 13 which co-operates with the bucket sheave 12. The force applied to the bucket to lift the same is transmitted from the sheave 12 to bail 7 and thence through equalizing bars 5—5 and chains 4—4 to the doors 2, the weight of the bucket and the contents thereof being carried on the doors. After being raised, as aforesaid, the bucket is moved to the position where its contents
a. ; to be discharged by proper manipulation
of the trolley 16 by means of its cable or
cables 18. After having been brought to a
position over the point where its contents
are to be discharged, the lifting cable 13 is
manipulated to enlarge the loop of the cable
which co-operates with the bucket sheave
12 and the bucket is lowered so that it may
rest upon the ground, the bottom of a bin,
or upon a dump pile, as the case may be.

Referring now to Figure 2, attention is
called to the fact that the bucket is pro-
vided with two oppositely disposed and in-
wardly projecting brackets 19—19, each of
which is riveted, bolted or otherwise rigidly
secured to one of the sides of the bucket.
At each of its corners, the bail 7 is provided
with a pair of brackets 20—20 between which
is pivoted a substantially Z-shaped bar 21.
That portion of the bar 21 which extends
rearwardly from its pivot is provided with
a weight 22 which normally tends to hold
the bar 21 in the position illustrated in Figure 1. It will be noted that the bar 21 is
provided with a portion 23 which projects
downwardly therefrom behind its pivot
point. The lower end of the portion 23 is
conformed to present a hook adapted to co-
operate with one of the bucket brackets 19.
That portion of each of the bars 21, which
lies in front of the pivot thereof, is turned
inwardly across the bucket in a line substan-
tially parallel with the bail top bar, and is
then turned forwardly to provide a tripping
arm 24. It will be noted that the tripping
arms 24 of the two bars 21 lie in immediate
proximity to each other. These tripping
arms may merely lie side by side without be-
ing fastened together, as shown in Figure 3,
or they may be riveted or otherwise secured
together, as shown in Figure 4.

It will be understood that when a loaded
bucket has been deposited at the point where
its contents are to be discharged, and after
the loop of the lifting cable 13 which co-
operates with the sheave 14 has become slack,
the bail 7 will move by gravity downwardly
independently of the bucket. Ordinarily
the weight of the bail and parts carried
thereby is sufficient to cause the bail to move
downwardly independently of the bucket, as
just explained, but of course it is apparent
that springs might be interposed between
the bucket and the bail to accelerate the
downward movement of the latter, if de-
sired. When the bail moves downwardly
upon the bucket, as just explained, the bev-
eled surfaces of the hooks 23 slip past the
bucket brackets 19, whereupon the weights
22 cause the hooks to engage under the
brackets 19. When the bucket is now raised
by proper manipulation of the lifting cable
13, the lifting force is transmitted from the
sheave 12 to the bail 11 and thence through
hooks 23 to the bucket brackets 19. Under
these conditions the chains 4, which nor-
mally hold the bucket doors 2 closed, are
slack. The bucket is thus lifted with its
doors open.

After the bucket has been lifted to a posi-
tion adjacent the under side of the trolley
16, the tripping arms 24 are brought into
engagement with an abutment 25 projecting
downwardly from the trolley 16. The en-
gagement of this abutment with the trip-
ping arms 24 causes the hooks 23 to disen-
gage the bucket brackets 19—19, with the
result that the bucket moves downwardly on
the bail 7 until the doors 2—2 are fully
closed, after which the weight of the bucket
and the weight of any material which may
subsequently be placed therein is carried on
the doors.

The abutment 25 is conveniently in the
form of a U-shaped steel strap which lies
around the sheave 15 and has the upper ends
of its legs bolted or otherwise secured to the
trolley 16.

Having thus described my invention, what
I claim as new and desire to secure by
United States Letters Patent, is:

1. In combination with a bucket having
a hingedly mounted bottom door, a hoisting
cable, a bucket carrier of inverted U shape
attached to said cable and mounted on said
bucket for vertical sliding movement there-
on, flexible means interposed between the
bucket and said door, said flexible means
adapted to become taut and hold the door in
closed position when the carrier is lifted by
means of the hoisting cable, a pair of latch
engagers carried by the bucket and disposed
on opposite sides thereof, a pair of gravity
latches mounted on the carrier, each of said
gravity latches arranged to lock with one of
said latch engagers when the carrier moves
downwardly relatively to the bucket to a
predetermined point on the latter, a member
toward which the bucket is raised, and away
from which the bucket is lowered by said
hoisting cable, and a trip device carried by
said last mentioned member, said trip device
arranged simultaneously to disengage said
latches from their respective latch engagers
when the bucket and carrier have been ele-
vated to a definite height by said cable.

2. In combination with a bucket having a
hingedly mounted bottom door, a hoisting
cable, a bucket carrier of inverted U shape
attached to said cable and mounted on said
bucket for vertical sliding movement there-
on, flexible means interposed between the
bucket and said door, said flexible means
adapted to become taut and hold the door in
closed position when the carrier is lifted by
means of the hoisting cable, a pair of latch
engagers carried by the bucket and disposed
on opposite sides thereof, a pair of latches,
one mounted on each side of the carrier, weights associated with said latches and normally holding said latches in position to lock with said latch engagers when the carrier moves downwardly upon the bucket to a definite position, a latch releasing arm fixed to each latch and extending therefrom toward the other latch, the adjacent ends of said arms being offset and brought together to constitute a latch releasing finger, a member away from which the bucket is lowered by said hoisting cable, and a trip device on said member adapted to engage said latch releasing finger to detach said latches from said latch engagers when the bucket and carrier have been elevated to a predetermined height by the hoisting cable.

In witness whereof, I hereunto subscribe my name this 8th day of June, 1920.

CLYDE NOLAN.

Witnesses:
MARION WARDELL,
EDWIN M. WOLFE.